| United States Patent [19] | [11] Patent Number: 4,539,221 |
| Jacob et al. | [45] Date of Patent: Sep. 3, 1985 |

[54] PROCESS FOR THE CHEMICAL VAPOR DEPOSITION OF OXIDIC PARTICLES

[75] Inventors: Herbert Jacob, Burghausen; Robert Rurländer, Emmerting; Anton Schnegg, Burghausen, all of Fed. Rep. of Germany

[73] Assignee: Wacker-Chemitronic Gesellschaft für Elektronik-Grundstoffe m.b.H., Burghausen, Fed. Rep. of Germany

[21] Appl. No.: 607,602

[22] Filed: May 7, 1984

[30] Foreign Application Priority Data

Sep. 28, 1983 [DE] Fed. Rep. of Germany ....... 3335126

[51] Int. Cl.$^3$ .................. B05D 3/06; C03B 37/07; C03B 37/075
[52] U.S. Cl. .................................... 427/53.1; 65/3.12; 427/163; 427/237; 427/166
[58] Field of Search ............... 427/237, 163, 166, 167, 427/53.1, 255, 109; 423/400; 502/200; 65/3.11, 3.12, 18.2; 350/96.34

[56] References Cited

U.S. PATENT DOCUMENTS 4,177,645 12/1979 Schwarz ......................... 423/400 X
4,334,903 6/1982 MacChesney et al. .......... 65/18.2 X

*Primary Examiner*—Michael R. Lusignan
*Attorney, Agent, or Firm*—Collard, Roe & Galgano

[57] ABSTRACT

A process for the chemical vapor deposition of oxidic particles by oxidation of halides or halide mixtures wherein dinitrogen monoxide is used as the oxidizing agent. The reaction is carried out at comparatively low temperatures of between 900° and 1150° C., but results in high yields.

4 Claims, No Drawings

PROCESS FOR THE CHEMICAL VAPOR DEPOSITION OF OXIDIC PARTICLES

The invention relates to a process for the chemical deposition of oxidic particles by oxidation of a gas current impinged upon or contacted by a halide or halide mixture in a substantially homogeneous vapor-phase reaction.

In the optical fiber technology, it is known from DE-AS No. 25 07 340 to bring about a substantially homogeneous vapor-phase reaction by reacting gaseous silicon tetrachloride (if desired with the addition of doping agents, e.g., germanium tetrachloride) with an oxygen current (if desired with a partial or complete substitution of the oxygen by dinitrogen monoxide, carbon dioxide, or nitrogen monoxide at temperatures of at least 1200° C., typically 1200–1600° C. A fundamental condition mentioned for such a homogeneous vapor-phase reaction to take place which, contrary to a heterogeneous vapor-phase reaction, occurs mainly without a heated container wall taking part, is a sufficiently high reaction temperature (for silicon dioxide based systems, at least 1200° C.). A lower temperature results, according to the statement in the literature, in a heterogeneous reaction which, compared to the homogeneous vapor-phase reaction, only leads to lower deposit rates. With higher temperatures, on the other hand, for instance, when using reaction tubes of quartz, conventional in glass fiber technology, the danger of dislocations and deformations has to be faced.

It is therefore an object of the present invention to provide a process which permits the chemical vapor deposition of oxidic particles by oxidation of a gas stream impinged upon or contacted by a halide or halide mixture in a substantially homogeneous vapor phase reaction at high yields and which avoids reaction temperatures of above 1200° C.

This object is accomplished according to the invention by a process which uses dinitrogen monoxide as the oxidizing agent which is reacted with the halide-containing gas stream in a heating zone ranging between 900 and 1150° C.

The process according to the invention is primarily suitable for the oxidation of halides, which are in the gaseous state under the temperature and pressure conditions selected for the reaction, and which are affected by oxygen resulting in oxide formation. Suitable halides are, in addition to some covalent bromides and iodides of, e.g. silicon, germanium, or tin, first of all the chlorides of boron, aluminum, silicon, germanium, tin, phosphorus, titanium and zirconium. They may be used as pure gases or as gas mixtures so that it is possible to obtain pure oxides or mixed oxides, depending on the type of starting material. Consequently, it is possible when using the process according to the invention for the purpose of producing base material for optical fibers, to obtain the high yields mentioned above while keeping the losses of the frequently expensive doping agents low, especially when compared with the conventional reactions with oxygen.

When a halide mixture is used, particularly when a homogeneously mixed, e.g., a doped product is desired, one can first introduce the corresponding mixture of halides, e.g., in the form of a solution. However, it is also possible to feed the individual halides alone into a gas stream and to mix them in the vapor phase. In this manner, advantageously, concentrations can be varied in the material obtained and, for instance, gradients of doping agents can be obtained.

As carrier gases, inert gases, such as nitrogen or noble gases, may be used. Preferably, however, dinitrogen monoxide, which is used as the oxidizing agent, is also used for this purpose, and usually in pure, undiluted form. Principally, however, dilution is feasible by the addition of inert gases, e.g, nitrogen or argon, oxidizing gases, e.g., oxygen or nitrogen dioxide, or also carbon dioxide. Such an addition of gases, especially inert gases, is advisable in cases where the amount of dinitrogen monoxide is not sufficient to maintain a flow velocity which would avoid a possible reversal of the oxidation reaction from the heating zone.

The impingement of the selected carrier gases upon the halides or halide mixtures provided as reaction partners may be brought about, for instance by feeding them in a gaseous state in the desired quantity, controlled, e.g., by the flow rate. An advantageous method consists of contacting the carrier gases with the reaction partners preferably while they are in a liquid state and maintained at a certain temperature by thermostatic control, contact being made, e.g., by passing the carrier gas through the reaction partners. Depending on the vapor pressure, adjusted by the temperature, the carrier gas will then absorb a certain amount of the halide vapors. By changing the temperature, the vapor pressure and thereby the amount of reaction partner absorbed by the carrier gas can be governed.

The pressure range, within which the process of the invention can be carried out, extends from a vacuum of about 1–10 mbar to a slight excess pressure above atmospheric pressure, which is determined in its upper limit usually by the existing apparatus. Preferably, however, it is best to operate at atmospheric pressure.

It is advantageous to adjust the ratio of halide and dinitrogen monoxide in the resulting stream of vapor in such a manner that per one atom of halide, 1–3 atoms of oxygen are present; thus, in the case of silicon-, germanium-, tin-, or titanium tetrachloride, per mole, at least 4 moles of dinitrogen monoxide are used. An increase of the monoxide above the upper limit—which in the above-mentioned example would be 12 moles—results, as a rule, in only slight improvements of yield. Therefore, for economical reasons, this procedure would only be followed in cases of very precious starting or end products.

For the reaction proper, a gas mixture of the desired composition is fed into a reaction chamber which may be, e.g., tube- or bell-shaped, where it flows through a heating zone of 900–1150° C., preferably 950–1100° C. The required temperature can be obtained, for instance, by one or several annular-shaped burners, by induction heating or resistance heating. The heating zone serves mainly for igniting the reaction mixture and may, therefore, be limited to a length of about 1 to 20 cm. After ignition, the reaction proceeds exothermally, sometimes with flame generation, and almost without the wall of the reaction chamber taking part. In other words, it proceeds homogeneously in the vapor phase, and, as a rule, with high, frequently quantitative, yields. By variation of the flow velocity of the vapor, the position of the reaction front can be checked in a simple manner. With an increase in the length of the heating zone - and depending on the flow rate - the time increases within which already formed oxidic particles are exposed to the elevated temperature. Since with an increase in the so-called dwell time the particle size of the product grows, the distribution of oxidic particles of different sizes can be controlled by adjustment of the rate of flow and of the length of the heating zone. When the flow rate is high and the heating zone is short and, thus, when the dwell time is short, a powder of very fine grain is obtained. A low flow rate and/or long heating zone will yield a less fine-grain product and sometimes a product of flocculent consistency.

The reaction per se between the chosen halide and the dinitrogen monoxide proceeds very rapidly, probably by means of the atomic oxygen liberated by the decomposition of the monoxide, so that even with short dwell times high yields are obtained. Preferably, the rate of flow and the length of the heating zone are so coordinated that dwell times between 0.1 and 40 seconds, advantageously between 2 and 30 seconds, will result. In most cases, this time will be sufficient to impart the desired particle size to the product which is suitable for the intended purpose, such as the interior coating of quartz tubes.

In a further preferred embodiment of the invention, the splitting off of the oxygen from the dinitrogen monoxide is facilitated by irradiating the vapor stream to be reacted with a suitable electromagnetic radiation, e.g., laser radiation; this, in turn, promotes the reaction with the reaction partner.

The reaction product obtained consists mostly of vapor-dispersed oxidic particles. Due to the low operating temperatures and the low wall temperatures, the particles can be conveyed with the vapor stream out of the reaction zone and deposited solely in a separate deposition zone, e.g. on the wall of the container or on the objects provided for deposition. By adjustment of an appropriate flow rate, the position and the length of the deposition zone may be easily varied. If necessary, the deposition may be promoted by additional measures, for instance, by the application of an electric field.

The process of the invention is adapted to a wide field of application. For instance, in the above-mentioned optical fiber technology it may be used for the production of base material in the so-called MCVD (Modified Chemical Vapor Deposition) or VAD (Vapor Axial Deposition) - processes. Moreover, it may be used, e.g., in the preparation of oxides, such as highly dispersed silicic acid, titanium dioxide or zirconium dioxide.

Compared with processes using molecular oxygen as the oxidizing agent, the advantages of the invention include, inter alia, low reaction temperatures and high yields.

In the following, the invention will be more fully described in a number of examples and comparison examples, but it should be understood that these are given by way of illustration and not of limitation.

EXAMPLE 1

A quartz tube of 12 mm inner diameter and 2 mm wall thickness was heated by resistance heating over a length of 15 cm to a temperature of about 1050° C.

Through the tube, a vapor stream was passed consisting of dinitrogen monoxide and silicon tetrachloride, the ratio of chlorine to oxygen being 1 : 1. This composition was obtained by bubbling dinitrogen monoxide through silicon tetrachloride contained in a storage vessel, where it was maintained by a thermostat at a temperature of about 21° C., the amount of $SiCl_4$ being absorbed corresponding to the vapor pressure obtained. The flow rate we so adjusted that a dwell time of 6.3 seconds resulted in the heated zone. The reaction was carried out at normal pressure.

Immediately after the gas mixture entered the heated zone, the reaction was initiated with a light pink color appearing. While the vapor passed through the heated zone of the quartz tube, the formed oxidic particles grew larger and streamed in the form of white clouds through an adjacent feed conduit or line, likewise made of quartz and having a length of about 10 cm, to the deposition zone where they were absorbed by the latter. The deposition zone consisted of a quartz tube attached to the feed line by melting. The latter quartz tube had a length of 20 cm, an inner diameter of 30 mm and was not heated.

About 12.7 g of silicon tetrachloride and about 13.2 g of dinitrogen monoxide were reacted. In the deposition zone 4.4 g of $SiO_2$ were obtained (yield 98% of the theoretical) in the form of a fine powder which could be melted to quartz glass without foaming or gas development.

COMPARISON EXAMPLE 1a

In the same apparatus, a comparison test was made with pure oxygen. The heated zone was again maintained at silicon tetrachloride were reacted with 5.16 g of oxygen (corresponding to an atomic ratio Cl : O of 1 : 1. Obtained were 1.35 g of $SiO_2$-powder (yield 28% of the theoretical), in addition to about 1 g of an oily-viscous mass which generated large amounts of HCl. The powder could only be melted to quartz with development of gas and while foaming.

EXAMPLE 2

In an apparatus corresponding to Example 1, 8.11 g of germanium tetrachloride were reacted with 13.07 g of dinitrogen monoxide; the atomic ratio of Cl : O was 1 : 2. The temperature of the heated zone was 1050° C., the dwell time about 30 seconds. The rapidly progressing reaction, with flame development, resulted in 3.26 g of $GeO_2$ (yield 81% of the theoretical) in the form of a fine powder.

COMPARISON EXAMPLE 2a

In a comparison test corresponding to Example 2, 7.89 g of germanium tetrachloride were reacted with 4.66 g of pure oxygen (the atomic ratio of Cl : O was 1 : 2) at about 1050° C. and a dwell time of 32 seconds. Obtained were only 1.95 g of $GeO_2$ (yield 50% of the theoretical) in the form of a powder.

While only several examples and comparison examples of the present invention have been described, it is obvious that many changes and modifications may be made thereunto, without departing from the spirit and scope of the invention.

What is claimed is:

1. In a process for the chemical vapor deposition of oxidic particles by oxidation of a gas current impinged upon by a halide or a halide mixture in a substantially homogeneous vapor phase reaction, the improvement comprising the steps of:
   oxidizing said gas current by using dinitrogen monoxide as the oxidizing agent and reacting the same with a halide-containing gas current in a heating zone having a temperature between 900 and 1150° C.

2. The process according to claim 1, wherein said halide is a member selected from the group consisting of boron chloride, aluminum chloride, silicon chloride, germanium chloride, tin chloride, phosphorus chloride, titanium chloride and zirconium chloride and a mixture of said chlorides.

3. The process according to claim 1, wherein the ratio between the parts of halide and dinitrogen monoxide in the gas current is so adjusted that per atom of halogen, 1-3 atoms of oxygen are present.

4. The process according to claim 1, additionally including the step of depositing oxidic particles produced in the heating zone in a separate deposition zone.

* * * * *